March 20, 1956  E. D. VISSING  2,738,585
TELESCOPIC COVER DEVICES
Filed Jan. 19, 1953  2 Sheets-Sheet 1

INVENTOR
ELLINN DEE VISSING

March 20, 1956  E. D. VISSING  2,738,585
TELESCOPIC COVER DEVICES
Filed Jan. 19, 1953  2 Sheets-Sheet 2
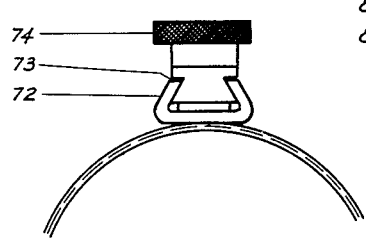
Fig. 4
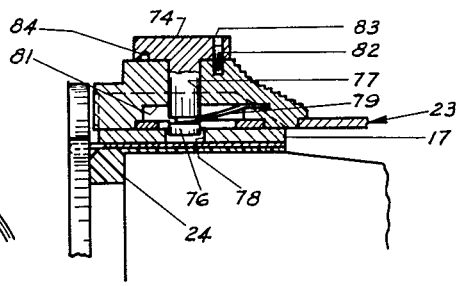
Fig. 5
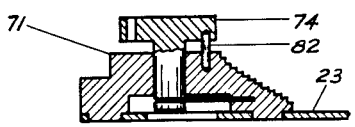
Fig. 6
Fig. 7
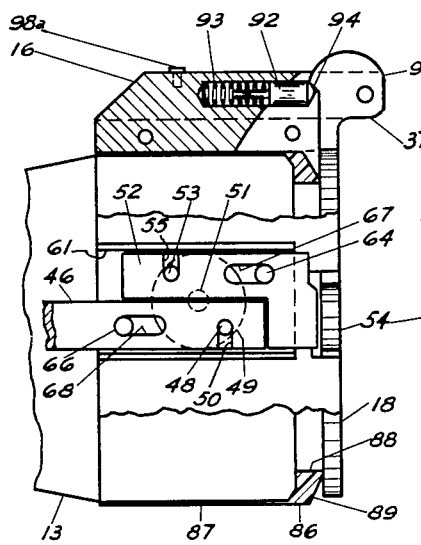
Fig. 8
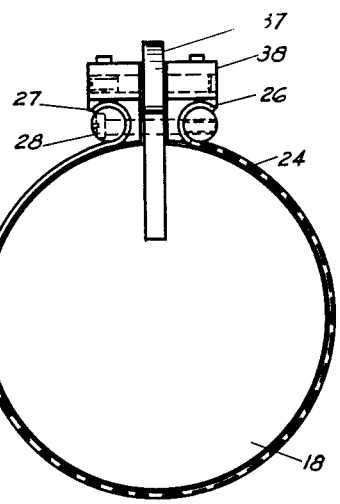
INVENTOR.
Ellinn Dee Vissing
BY Llewellyn A. Young
His Attorney

# United States Patent Office 2,738,585
Patented Mar. 20, 1956

2,738,585

TELESCOPIC COVER DEVICES

Ellinn Dee Vissing, Idaho Falls, Idaho

Application January 19, 1953, Serial No. 331,795

4 Claims. (Cl. 33—50)

This invention relates to telescopic devices, and more particularly to a telescopic sight for a rifle.

An object of the invention is the provision of a sight of the above character having end covers for the lenses with novel means for controlling the actuation of the lens covers.

Another object of the invention is the provision of a telescopic sight of the above character having end covers with novel means for positioning the covers in the open position so as to provide an unobstructed view of the target.

Another object of the invention is the provision in a telescopic sight of the above character of novel means for preventing the inadvertent actuation of the mechanism for opening the end covers.

Another object of the invention is the provision of a telescopic sight of the above character with novel means for forming a seal between the ends and the telescopic sight proper.

Another object of the invention is the provision of a telescopic sight of the above character that is simple to construct, that is positive in its action, that positively prevents the lenses from being affected by outside elements when the telescopic sight is in an inoperative position, that is easy to operate, that is light, compact and durable, and that is comparatively inexpensive to produce.

Other objects and advantages will become more apparent upon reference to the accompanying drawing in which:

Figure 4 is a fragmentary view taken substantially along the line 4—4 in Figure 3.

Figures 5 and 6 are enlarged fragmentary sectional views of the operating button and associated structure in different operating positions.

Figure 7 is an enlarged fragmentary sectional view of the actuating mechanism at the end of the telescope away from the operating button.

Figure 8 is an end view of the sight.

Figures 1, 2, 3:
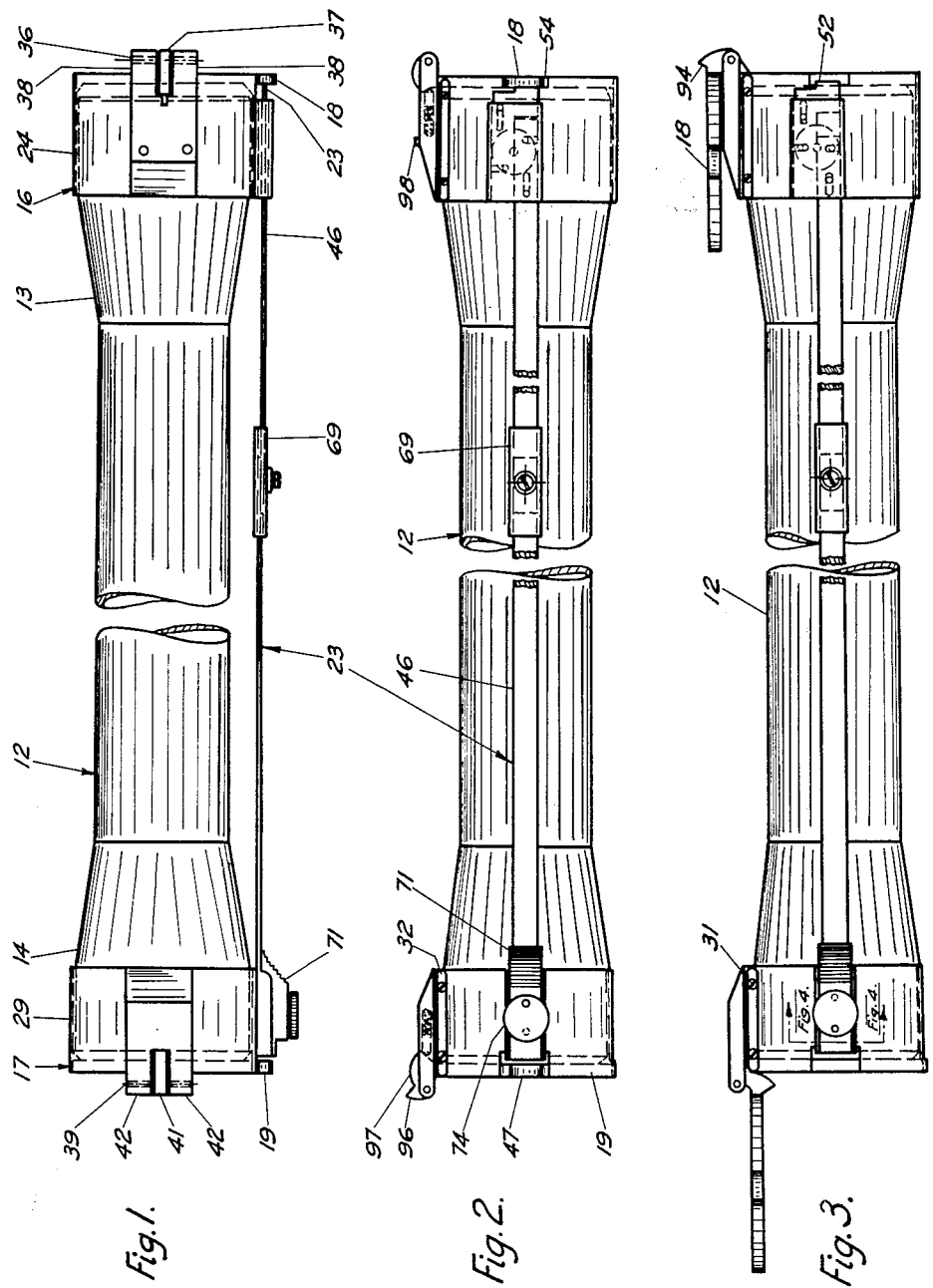
Figure 1 is a top view of a telescopic sight embodying the present invention.
Figure 2 is a side view of the telescopic sight with the covers in their closed position.
Figure 3 is a side view of the telescopic sight with the covers in a partially opened position.

Referring now to the drawings, the invention is shown embodied in a cover attachment for a telescopic sight 11 of the type adapted to be mounted on a rifle, not shown. The telescopic sight 11 may be any conventional type and as shown herein includes an elongated tubular housing 12 having an enlarged end 13 for supporting a viewing lens of conventional construction, not shown, and an enlarged end 14 housing an objective lens of conventional construction, not shown.

In this embodiment of the invention the cover attachment includes cover mounting means 16 and 17 adapted to be attached to the ends 13 and 14 respectively of the tubular housing 12, end covers 18 and 19 movable between a closed position in which the latter form a substantially element-proof seal with the tubular housing to protect the lenses and an open position in which the telescopic sight may be used to sight upon an object in a conventional manner, hinge means acting respectively between each cover mounting means and its associated cover, and actuating means 23 for simultaneously applying a pushing force to each cover 18 and 19 to move them concurrently from their closed position to their open position.

The cover mounting means 16 in this instance is a generally split tubular member 24 shaped to fit upon the end 13 of the tubular housing 12. The member 24 as shown is formed from thin ribbon-like material, the thickness being such that the telescopic sight can be readily mounted upon the rifle without interfering with the bolt action thereof. End portions of the ribbon, as best seen in Figure 8, are bent back upon the central portion to define flanges 26 and 27. Screws 28 extend through both flanges 26 and 27 so that when the screws are tightened, the ribbon-like material 24 is clamped tighter onto the end of the housing. This construction thus provides an adjustable clamp for positively securing the member 24 on the housing 12.

The cover mounting means 17 in this instance is of similar construction and includes a split tubular member 29 of thin ribbon-like material fitting snugly about the end 14, with screws 31 extending through flanges 32, only one of which is shown.

The covers 18 and 19 as shown herein are generally circular members. As best seen in Figures 1, 7 and 8 the cover 18 is hinged to the cover mounting means 16 by a pivot pin 36 acting between a projection 37 formed on the top of the cover 18 as shown and spaced ears 38 formed on the outer edge of the cover mounting means 16 to overlie the rear end of the housing. In a similar manner the cover 19 is supported by a pivot pin 39 extending through a projection 41 formed on the top of the cover 19 as shown and spaced ears 42 formed on the outer edge of cover mounting means 17 to overlie the front end of the housing.

The cover actuating means is arranged to provide a positive pushing force concurrently to each cover 18 and 19 so that the respective covers may be forced or pushed open simultaneously. To this end a horizontal actuating rod 46 is disposed at one side of the housing 12, as best shown in Figures 2 and 3, in parallel relation with the longitudinal axis of the housing. At one end the actuating rod is shaped to abut against a radially extending ear 47 at one side of and rigid with the cover 19. At its opposite end (see Figure 7) the actuating rod 46 is pivotally interconnected with an outwardly projecting, eccentrically mounted pin 48 mounted on a bell crank lever or disc 49 and received in notch 50 formed in the edge of the actuating rod 46. The disc 49 is pivotally mounted on the cover mounting means 16 by a pin 51. Diametrically opposite the pivotal connection between the actuating member 46 and the pin 48, the crank 49 is pivotally interconnected with one end of a horizontal lever 52 by an outwardly projecting pin 53 received in notch 55 formed on one edge of the lever 52. The lever 52 is arranged to have its opposite end abut against a radially extending ear 54 rigid with the cover 18. Preferably the latter end of the lever 52 is offset (see Figure 7) with respect to the axis of the lever 52 so that the pushing force is applied to the cover 18 at a position substantially in alignment with the longitudinal axis of the actuating rod 46.

As best seen in Figures 2, 3 and 8 the actuating rod 46, the lever 52 and the eccentric crank 49 are recessed in an axially extending groove 61 formed in a body 63 mounted on the side of the cover mounting means 16. A cover plate 62 rigidly secured to the body 63 retains the rod, lever and crank in assembled operative relation. Outwardly extending pins 64 and 66 rigid with the cover mounting means 16 interfit in elongated horizontal slots 67 and 68 respectively formed in levers 52 and 46 and coact with the ends of the slots to define stops limiting movement or displacement of the levers. The actuating rod 46 may be formed with two overlapping elongated flat members, such as are shown, secured together by an adjustable clamp 69. This construction permits adjusting the length of the actuating rod thereby permitting this actuating rod to be used on any conventional telescopic sight.

An operating button 71 is provided at one end of the actuating member 46. The button 71 is arranged so that pressure applied to the button moves the actuating rod 46 bodily to the left from the position shown in Figure 2 to that shown in Figure 3. This movement of the actuating rod applies a pushing force to the ear 47 on the cover 19 and causes the bell crank 49 to move in a clockwise direction, moving the lever 52 bodily lengthwise of the housing 12 to push against the ear 54 to open the cover 18. A generally U-shaped channel 72 (see Figure 4) mounted on the side of the housing 12 fits with the mating grooves 73 formed on the actuating button 71 to provide a retaining guide or track for the actuating member 46.

Provision is made for preventing accidental displacement or movement of the actuating member 46. To this end the button 71 is formed with a locking pin 74 (see Figure 5) having a portion 76 extending through a vertically arranged opening 77 formed in the operating button 71. The portion 76 of the pin is adapted to interfit in a hole 78 formed in the cover mounting means 17 so that the pin 74 coacts with the sidewalls of the hole 78 to limit or prevent movement of the button 71. The end of the pin 76 is normally urged into the opening 78 by a leaf spring 79 disposed in a recess 81 formed into the button 71. As shown, one end of the spring 79 is rigidly attached to the operating button 74 in cantilever fashion, and the other end engages the pin 74. The latter is provided with a knurled head so that it may be readily manipulated, that is, moved against the normal bias of the spring 79 and rotated. The pin 74 is normally held in position (shown in Figure 5) by an auxiliary upstanding locking pin interfitting in a vertically disposed opening 83 formed in the head of the pin 74. When it is desired to open the covers 18 and 19, the pin 74 is pulled or displaced upwardly (see Figures 5 and 6) and rotated so that the head of the pin overlies the pin 82. This displacement of the pin removes the end 76 of the pin from the opening 78 so that the button 71 may be shifted as desired. The pin may be held in this position by providing a notch 84 on the underside of the head of the pin shaped to receive the end only of the pin 82.

One aspect of the invention is the provision of novel means for positively providing seals at the ends of the housing 12 so as to protect the lenses against dust, dirt, moisture, and other elements. The seal 86 in this instance includes a member shaped to be disposed between the cover mounting means and the housing and the end of the housing and the cover 18. Thus, the seal 86 includes a tubular or circular portion 87 disposed between the mounting means 16 and the tubular housing 12, and has an annular portion 88 overlying the end of the housing and formed with a converging external surface 89 shaped to engage the inner side of the cover 18. With this construction the mounting means 16 compresses the tubular portion 87 so that a positive seal is assured between the mounting means 16 and the housing 12. The cover 18 engages the outer edge of the annular portion 88 and compresses the latter so that when the cover is in its closed position a positive seal between the cover and the housing is assured. The seal for the opposite end of the housing that coacts with the cover 19 is of similar construction.

Provision is also made for applying pressure to the cover 18 so that when the latter is in its closed position it is biased into engagement with the seal 86. As best shown in Figure 7, a cam surface 91 formed on the projection 37 and spring-biased follower 92 are arranged to urge the cover 18 into engagement with the seal 86. The follower is mounted in a horizontal opening 93 formed between the spaced ears 38 on the cover mounting means 16 and projects outwardly therefrom to engage the arcuate cam surface formed on the projection 37 rigid with the cover 18. A dwell 94 is formed on the cam surface 91 and is shaped so that when the cover is in its closed position, as shown in Figure 7, the spring-biased follower 92 acts at an off-center position (i. e., longitudinal axis of follower is at one side of hinge axis of cover 18) upon the cam to apply a constant biasing force to the cover urging the latter into tight engagement with the seal. This construction thus, in effect, provides an over-center device for applying a constant pressure on the cover 18. The shape of the cam is also such that the cover 18 may be moved 270 degrees, i. e., from the solid line position in Figure 2 to the position shown in Figure 3.

The cover 19 is provided with a similar biasing or over-center construction. The cover 19 is limited to movement through a 90 degree arc by a stop 96 on the cam surface 97 of the cam associated with cover 19.

In conventional scopes with conventional end covers, often when the covers are opened they strike against the telescope housing, producing a noise which may frighten wild game. To prevent this clicking noise a bumper 98a is formed on the top of the cover mount 16 so as to provide a stop for the cover 18. The bumper is preferably made of resilient material so as to minimize, if not entirely eliminate, this clicking noise when the covers are opened.

From the foregoing it is readily seen that this construction is simple and easy to construct. Moreover it can be used on any conventional sight. The end covers are positively, simultaneously pushed open with a minimum of manipulation and bother. The seal is positive and insures a minimum of interference as a result of weather elements. The noise eliminator and the safety button are all features that insure a highly efficient piece of equipment.

I claim:

1. In a cover device for a telescope having an elongated housing the combination comprising a first cover for closing one end of said housing, a second cover for closing the opposite end of said housing, a first hinge means between the first cover and the said housing, second hinge means between the second cover and the housing, an actuating member disposed at one side of said housing and bodily movable between opposed positions; means for mounting said actuating member to have one end adjacent said first cover and the opposite end adjacent the other cover, and means between the opposite end of said actuating member and said other cover to translate movement of said actuating member away from said other cover into positive movement against said other cover whereby bodily movement of said actuating member in one direction effects a pushing force simultaneously to both covers for forcing the latter open concurrently.

2. In a cover device for a telescope having an elongated housing the combination comprising a first cover for closing one end of said housing, a second cover for closing the opposite end of said housing, a first hinge means between the first cover and the said housing, second hinge means between the second cover and the housing, an actuating member disposed at one side of said housing and bodily movable between opposed positions; means for mounting said actuating member to have one end adjacent said first cover and the opposite end adjacent the second cover, means between the opposite end and said second cover to translate movement away from said second cover into positive movement against said second cover whereby bodily movement of said actuating member in one direction applies a pushing force to both covers simultaneously for forcing the latter open, and means for locking said actuating member in a fixed position whereby to prevent the accidental bodily movement of said actuating member.

3. In a cover device for a telescope having an elongated housing the combination comprising a first cover for closing one end of said housing, a second cover for closing the opposite end of said housing, a first hinge means between the first cover and the said housing, second hinge means between the second cover and the housing, a first elongated lever disposed at one side of said housing and bodily movable between opposed positions; means for mounting said first elongated lever to have one end adjacent said first cover and the opposite end spaced from the second cover, a second lever disposed at the same side of said housing as said first elongated lever, means for mounting said second lever to have one end adjacent said opposite end of the first lever and its other end adjacent the second cover, and means between said first and second levers for translating movement of said first lever away from said second cover into positive movement against said cover whereby bodily movement of one of said levers in one direction applies a pushing force to both covers simultaneously for forcing the latter open.

4. In a cover device for a telescope having an elongated housing the combination comprising a first cover for closing one end of said housing, a second cover for closing the opposite end of said housing, a first hinge means between the first cover and the said housing, second hinge means between the second cover and the housing, a first elongated lever disposed at one side of said housing and bodily movable between opposed positions; means for mounting said first elongated lever to have one end adjacent said first cover and the opposite end spaced from the second cover, a second lever disposed at the same side of said housing as said first elongated lever, means for mounting said second lever to have one end adjacent said opposite end of the first lever and its other end adjacent the second cover, means between said first and second levers for translating movement of said first lever away from said second cover into positive movement against said cover whereby bodily movement of one of said levers in one direction applies a pushing force to both covers simultaneously for forcing the latter open, and releasable means for locking one of said levers in a predetermined fixed position whereby to prevent accidental opening of said covers.

References Cited in the file of this patent

UNITED STATES PATENTS

| | | |
|---|---|---|
| 2,514,257 | Reavis | July 4, 1950 |
| 2,522,897 | Rotter | Sept. 19, 1950 |
| 2,523,639 | Tucker | Sept. 26, 1950 |
| 2,550,493 | Ohlson | Apr. 24, 1951 |
| 2,657,465 | Lloyd | Nov. 3, 1953 |

FOREIGN PATENTS

| | | |
|---|---|---|
| 317,188 | Germany | Dec. 12, 1919 |